Aug. 20, 1929.  A. M. CURTIS  1,724,994
DUPLEX TELEGRAPH SYSTEM FOR LOADED CABLES
Filed May 31, 1927
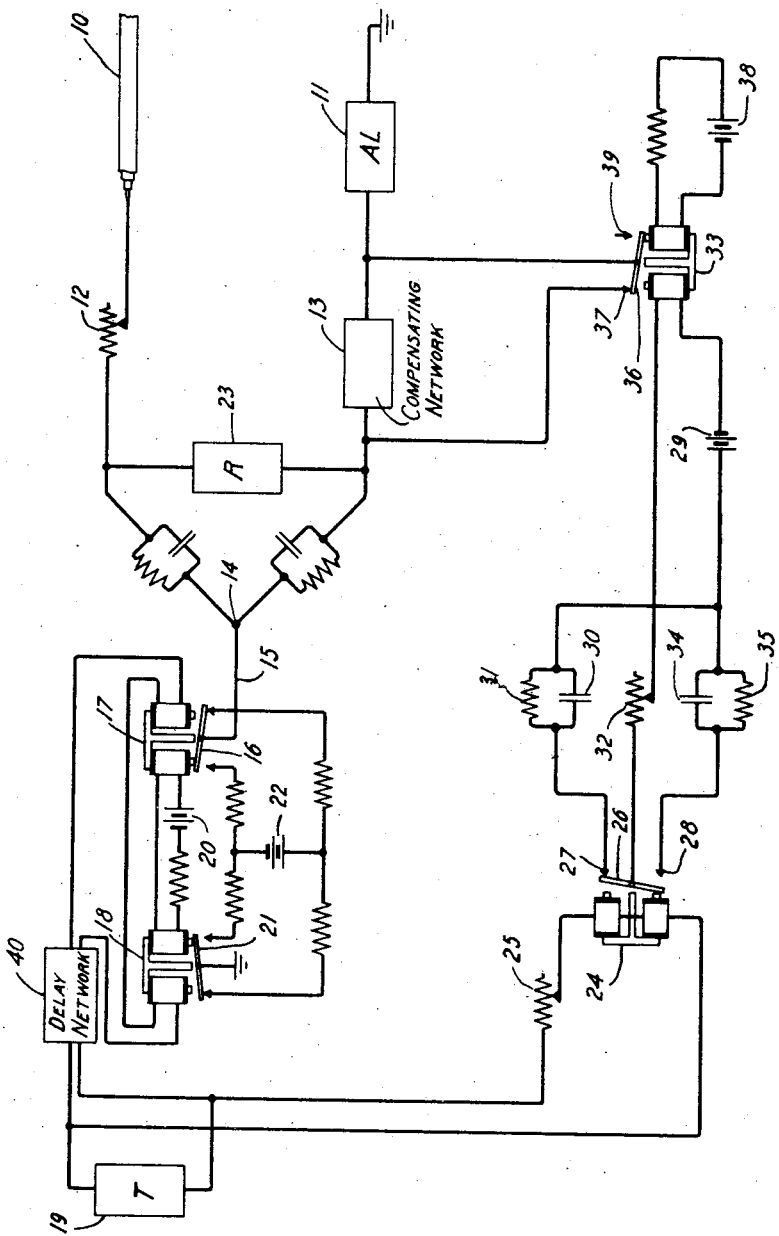
INVENTOR:
AUSTEN M. CURTIS
By
ATTORNEY Patented Aug. 20, 1929.

1,724,994

UNITED STATES PATENT OFFICE.

AUSTEN M. CURTIS, OF EAST ORANGE, NEW JERSEY, ASSIGNOR TO BELL TELEPHONE LABORATORIES, INCORPORATED, OF NEW YORK, N. Y., A CORPORATION OF NEW YORK.

DUPLEX TELEGRAPH SYSTEM FOR LOADED CABLES.

Application filed May 31, 1927. Serial No. 195,224.

This invention relates to duplex signaling systems, and more particularly to duplex telegraphy over continuously loaded submarine cables.

This invention is particularly well adapted to duplex telegraph systems in which a submarine cable is balanced by an artificial line having a somewhat different magnetic characteristic from that of the cable, and the principal object is to compensate under such conditions for a component of the unbalance wave which occurs every time the polarity of a transmitted signal is reversed.

A more specific object of the invention is to effect an appreciable reduction in the amplitude of that part of the unbalance wave which occurs immediately after a signal is impressed upon the cable and the artificial line when this signal is in the opposite direction to the signal last transmitted.

In a bridge duplex telegraph system the magnetic characteristics of the artificial line are very likely to be different from those of the cable regardless of what materials may be used for loading, it being very difficult to design an artificial line to exactly match a cable in all characteristics to the extreme degree of accuracy desirable in duplex operation. This difference in magnetic characteristics is particularly noticeable each time the polarity of the transmitted signals is changed because it is immediately after each current reversal that the hysteresis of the cable and the artificial line has its greatest effect. Inasmuch as the residual magnetization component of the hysteresis of the cable is different from that of the artificial line, a decided increase in the amplitude of the unbalance wave occurs at each reversal of signal current, and tends to upset the substantial balance of the system. In other words, the past history of a signal influences the magnetic characteristic of the cable somewhat differently from that of the artificial line, the result being that although the cable and the artificial line may be satisfactorily balanced for a repetition of positive signals or a similar repetition of negative signals, there is still a disturbing unbalance present for a few hundredths of a second after every change of signal polarity.

In accordance with a preferred embodiment of the present invention a substantial balance between the magnetic characteristics of the cable and the artificial line is maintained during the reversals of transmitted signal currents by automatically inserting a network at or near the head end of the artificial line when signals of reversed polarity are impressed on the cable. In this way the network is added when the difference in magnetic characteristics becomes troublesome, and a substantial balance of signaling voltages on the opposite sides of the bridge is thus maintained during intervals immediately following the changes of the signal polarity. The means for automatically inserting the network is preferably arranged so that the network remains in the circuit only long enough to allow the signal to pass a point in the cable and the artificial line beyond which the hysteresis effect becomes neglible. It may be necessary under certain conditions, in order to overcome an unbalance due to hysteresis to arrange automatic means for inserting the network at or near the head end of the cable instead of at or near the head end of the artificial line, and if this arrangement does not give the required balance, automatic means may be provided for inserting networks at or near the head ends of both the artificial line and the cable, it being understood, therefore, that the invention is not limited to the preferred embodiment.

This invention will be better understood by referring to the following detailed description taken in connection with the accompanying drawing in which the single figure illustrates the preferred embodiment of the present invention used in connection with a bridge duplex telegraph system.

Referring to the drawing, the submarine cable 10 having a continuous loading of "permalloy" terminates in a bridge duplex telegraph set in which the artificial line 11 is equipped with loading coils (not shown) wound on cores of some magnetic material which may be compressed iron dust or permalloy dust. The magnetic qualities of the cores differ considerably from those of "permalloy" tape or wire wound on the cable, and therefore an unbalance due to hysteresis is produced between the cable and artificial line at the beginning of each current impulse transmitted. This unbalance produces a distortion in the incoming signal wave, which distortion becomes particularly troublesome when the polarity of the signals is reversed. This distortion which appears in the wave at the beginning of each signal transmitted is caused by the difference in the magnetic characteristics of the cable and the artificial line extending over about the first two hundred miles from shore. Although it has been found in a particular case where the signal wave was made up of three elements, that is, one having positive and negative impulses separated by zero intervals equal to those of the impulses, that this distortion could be nearly compensated by the insertion of a resistance 12 at the head end of the cable, this method of compensating did not effect the desired balance when the polarity of the signal currents was reversed in a wave made up of only positive and negative impulses. Therefore a more satisfactory method was required and this method was found by employing together with the resistance 12 at the head of the cable, a suitable network 13 comprising a combination of impedance elements, at the head end of the artificial line. This network is so connected in the artificial line that it can be automatically inserted only when a signal of one polarity is followed by one of the opposite polarity, and is arranged to remain in the artificial line long enough to compensate the hysteresis component of the unbalance. In connection with the relative positions of the resistance 12 and network 13 it is understood that these may be interchanged, or that the network 13 alone may be employed or that a network similar to network 13 may be used in place of resistance 12. It is further understood that several networks may be inserted in the artificial line and operated in the same manner as network 13 shown in the drawing.

The cable and the artificial line are interconnected at apex 14 and are there connected to a common conductor 15 which extends to the armature 16 of relay 17. Relay 17 together with relay 18 constitutes a pair of "sending-on" relays for relaying signals from the transmitter 19 to the cable. Relays 17 and 18 are of the polarized type and are normally controlled by a biasing current in a circuit extending from battery 20, through left-hand winding of relay 17 and the right-hand winding of relay 18, back to the battery 20. The relays therefore normally connect the cable to earth through the battery tap resistances as shown in the drawing. The right-hand winding of relay 17 and the left-hand winding of relay 18 are included in a circuit extending through transmitter 19 and are so arranged with respect to each other that currents from the transmitter pass therethrough in opposite directions, the transmitter currents being of sufficient strength to overcome the biasing current in the other windings. The transmitter may be of any of the well known types adapted for telegraphic signaling and may be arranged in any well known manner to send signals of positive and negative polarities, or positive and negative impulses interspersed with periods during which the cable bridge apex 14 is earthed. When the transmitted signal impulse is positive, relay 18 will operate and close a circuit from earth, through armature and right-hand contact of relay 18, battery 22, right-hand contact and armature of relay 17, conductor 15 to cable 10 and artificial line 11 and the cable will then receive a positive impulse for transmission. When the transmitter sends a negative impulse, relay 17 will operate and cause a negative signal to be impressed upon the cable over a circuit traceable from earth, through armature and left-hand contact of relay 18, battery 22, left-hand contact and armature of relay 17, conductor 15 to the cable and the artificial line.

Arranged in the bridge across the cable and the artificial line is the receiving apparatus 23 which will be affected by outgoing signals if an unbalance exists between the cable and the artificial line, thereby causing distortion in the incoming signals. That part of this unbalance which is due to the difference in magnetic characteristics of the cable and the artificial line, is compensated for by the operation of the circuit controlled by relay 24, a portion of the current from each transmitted signal being sent through the windings of relay 24, the amount of current therein being regulated by an adjustable resistance 25. This relay is also of the polarized type but its armature 26 is free to remain against either of its associate contacts 27 and 28 until the polarity of the transmitted impulses is reversed. When successive impulses of a group are of one polarity the armature remains against the contact with which it was engaged by the first of the group but when the polarity is reversed the armature moves over to the other contact and remains there until the next reversal. Contact 27 when engaged with armature 26 closes a circuit extending from the positive pole of battery 29, through condenser 30 and resistance 31 in parallel, contact 27, armature 26, variable resistance 32, left-hand winding of relay 33 to the negative pole of battery 29. Contact 28 when engaged with armature 26 closes a similar circuit in which condenser 34 in parallel with resistance 35 is connected to contact 28. Relay 33 is also of the polarized type and its armature 36 normally engages with contact 37 as a result of a biasing current flowing from battery 38 through the right-hand winding of the relay. The engagement between armature 36 and contact 37 maintains a low resistance shunt path around network 13 during the time that the outgoing signal impulses are of the same polarity but when the polarity is reversed the shunt path is opened and network 13 enters into the circuit of the artificial line in a manner as will now be described.

During the time when the transmitter is sending the impulses of one polarity, the network is shunted as shown in the drawing but, as soon as an impulse of opposite polarity is sent, the position of armature 26 changes and closes the circuit at its associate contact 28. A sudden surge of current thus flows from battery 29 through condenser 34, this surge being of sufficient strength to overcome the biasing effect of battery 38 on relay 33 and the relay therefore operates to open the shunt path around network 13. The network is thus inserted in the artificial line circuit to effect the necessary balance with the cable when the polarity of the impulses is reversed. The surge through condenser 34 is only momentary because the circuit is so adjusted by resistances 32 and 35 that a steady current from battery 29 is insufficient to hold armature 36 away from contact 37. However, armature 36 is held in its open position, that is, in engagement with stop 39, for a sufficient time to permit the impulse of the reversed polarity to pass the point on the cable and artificial line beyond which the hysteresis effect is negligible. Resistance 35 is provided to effect the discharge of condenser 34 during the interval between the operations of relay 24, and is of such value that the current leaking through it and the left-hand winding of relay 33 during the time that condenser 34 is charged, is small compared to that of the surge which charges the condenser. When the polarity of the transmitted impulses is again reversed relay 24 will move its armature back to contact 27 thereby charging condenser 30 and relay 33 will again be operated to open the shunt around network 13. In this manner, the network is inserted in the circuit of the artificial line each time the polarity of the transmitted signals is reversed, and is removed as soon as the impulses pass beyond the point on the cable and artificial line where hysteresis becomes negligible. This point may be defined as that at which the signal wave has been attentuated to such a degree that the current is no longer strong enough to magnetize the cable or the artificial line.

In order to insure the operation of relay 33 and the insertion of network 13 in the artificial line before the transmitted signals of reversed polarity have reached the cable and the artificial line, a delay network 40 is inserted in the transmitting circuit. Network 40 is arranged to delay the relaying of the signals to the cable for a time sufficient to allow relay 33 to insert network 13 and thereby effect the necessary balance in the artificial line.

Although the invention is particularly adaptable to a system employing an artificial line loaded with inductance coils wound on iron dust cores and a cable loaded with permalloy, it is to be understood that the invention may be adapted to other submarine signaling systems to facilitate the matching of the magnetic characteristics of the cable with those of the artificial line, regardless of what materials are used for loading.

What is claimed is:

1. In a duplex system comprising a main line and an artificial line having different magnetic characteristics, and a receiving circuit connected thereto, the method of signaling by means of current impulses of different polarities, which comprises changing the impedance characteristic of one of said lines automatically at the time of a change in polarity of the transmitted signals.

2. In a duplex system comprising a main line and an artificial line having different magnetic characteristics, and a receiving circuit connected thereto, the method of signaling by means of current impulses of different polarities which comprises momentarily changing the impedance characteristic of one of said lines every time the polarity of the current impulses is changed.

3. In a duplex system comprising a main line and an artificial line having different magnetic characteristics, and a receiving circuit connected thereto, the method of signaling by means of current impulses of different polarities, which comprises neutralizing the flow of unbalance current in the receiving circuit during the time that successive impulses are of one polarity, and changing the impedance characteristic of one of said lines automatically at the time of change to an impulse of a different polarity.

4. In a duplex system comprising a main line and an artificial line having different magnetic characteristics, and a receiving circuit connected thereto, the method of signaling by current impulses of positive and negative polarities interspersed by zero intervals, which comprises neutralizing the flow of unbalance current in the receiving circuit during the time that successive impulses are of one polarity, automatically changing the impedance characteristic of the artificial line when impulses of a different polarity are transmitted, and delaying the transmission of signals to the cable and artificial line until the magnetic characteristics are balanced.

5. In a duplex system comprising a continuously loaded submarine cable and an artificial line having different magnetic characteristics, and a receiving circuit connected thereto, the method of sending three element signals which comprises continuously neutralizing the flow of unbalance current in the receiving circuit during the time that successive signaling impulses are of one polarity, automatically changing the impedance characteristic of the artificial line when successive impulses of different polarities are transmitted, and delaying the transmission of the signals to the cable and artificial line until after the impedances of the cable and artificial line are balanced.

6. The combination with a transmission circuit, of a balancing network therefor, comprising lumped impedance elements, and means for automatically changing an impedance characteristic of said network during periods of excessive unbalance.

7. The combination with a continuously loaded submarine cable transmission circuit, of a balancing network therefor, comprising lumped impedance elements, and means for automatically changing an impedance characteristic of said network during periods of excessive unbalance.

8. The combination with a continuously loaded submarine cable transmission circuit, of a balancing network therefor comprising lumped impedance elements of different magnetic characteristic from that of the loading of said transmission circuit, and means for automatically changing the impedance of said network to overcome said difference during periods of excessive unbalance.

9. A duplex system comprising a main and an artificial line having different magnetic characteristics, means for transmitting signals by current impulses of different polarities, means for producing a substantial balance in the system when successive impulses are of the same polarity, additional means for securing a balance when successive impulses are of different polarities, and means for delaying the transmission of signals to said cable when said successive impulses are of different polarities until after a balance is secured by said additional means.

10. A bridge duplex system comprising a continuously loaded submarine cable and an artificial line, inductance coils for said artificial line having magnetic cores, the hysteresis characteristic of which differs from that of the loading material of said cable, means for producing a substantial balance in the system when successive impulses are of the same polarity, and additional means for securing a balance momentarily when successive impulses are of different polarity.

11. A bridge duplex telegraph system comprising a submarine cable continuously loaded with an alloy of nickel and iron heat-treated to have a high permeability at the magnetizing forces employed in signaling, an artificial line, inductance coils having iron dust cores for said artificial line, the hysteresis characteristic of said iron dust cores differing from that of the nickel-iron alloy of the cable, means for producing a substantial balance in the system when successive impulses are of the same polarity, and additional means for securing a balance momentarily when successive impulses are of different polarities.

12. A bridge duplex telegraph system comprising a main line and an artificial line of different magnetic characteristics, a bridge connecting said lines, a transmitting means for applying signaling impulses of different polarities to said lines, a resistance connected between one of said lines and one end of said bridge, and a shunted network arranged between the other of said lines and the other end of said bridge for compensating for the effect of the hysteresis component of an unbalance between said lines, said resistance being employed alone when the outgoing signals are of one polarity, means for removing said shunt around said network momentarily at the time when the polarity of the impulses is reversed, and a network connected to said transmitting means for delaying transmission of said impulses to said main line at each of said reversals until after said shunt is removed.

13. In a bridge duplex telegraph system comprising a main line and an artificial line of different magnetic characteristics, transmitting means for applying signaling impulses of different polarities to said lines, a resistance in said main line and a network in said artificial line arranged to overcome the difference in magnetic characteristics of said lines, a normally closed shunt path around said network, a polarized relay having an unbiased armature and a pair of contacts associated therewith, said relay being arranged in parallel with said transmitting means and effective to operate in response to each reversal of polarity of the transmitted signal, a pair of condensers connected respectively to said pair of contacts and arranged to be alternately charged by the operations of said relay, a second polarized relay arranged to maintain said shunt path closed when said impulses are of one polarity and to open said path momentarily when the polarity of said impulses is reversed, said second relay being responsive to the surge produced by the initial part of the charge of each of said condensers, and a leak resistance arranged in shunt to each of said condensers whereby a charged condenser may discharge when the polarity of the transmitted signals is reversed.

14. A bridge duplex submarine telegraph system comprising a main and an artificial line of different magnetic characteristics, a transmitter for sending signal impulses of different polarities, a pair of relays for repeating said signal impulses to said lines, a network in one of said lines for effecting a balance of said magnetic characteristics when successive impulses are of one polarity, a second network arranged to be automatically and momentarily inserted in the other of said lines to effect a further balance when successive impulses are of different polarities, and a network connected to said transmitter for delaying the operation of said relays until after the said second network is inserted.

In witness whereof, I hereunto subscribe my name this 28th day of May, A. D., 1927.

AUSTEN M. CURTIS.